United States Patent
Ding et al.

(10) Patent No.: US 11,455,108 B2
(45) Date of Patent: Sep. 27, 2022

(54) METHOD AND DEVICE FOR CONTROLLING STORAGE FORMAT OF ON-CHIP STORAGE RESOURCE

(71) Applicant: LYNXI TECHNOLOGIES CO., LTD., Beijing (CN)

(72) Inventors: Ruiqiang Ding, Beijing (CN); Han Li, Beijing (CN); Chuan Hu, Beijing (CN); Feng Wang, Beijing (CN); Fanhui Meng, Beijing (CN); Yaolong Zhu, Beijing (CN)

(73) Assignee: LYNXI TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 17/639,613

(22) PCT Filed: Nov. 20, 2020

(86) PCT No.: PCT/CN2020/130618
§ 371 (c)(1),
(2) Date: Mar. 2, 2022

(87) PCT Pub. No.: WO2021/104179
PCT Pub. Date: Jun. 3, 2021

(65) Prior Publication Data
US 2022/0269430 A1 Aug. 25, 2022

(30) Foreign Application Priority Data
Nov. 25, 2019 (CN) .......................... 201911163456.9

(51) Int. Cl.
*G06F 3/06* (2006.01)
(52) U.S. Cl.
CPC .......... *G06F 3/0638* (2013.01); *G06F 3/0608* (2013.01); *G06F 3/0673* (2013.01)

(58) Field of Classification Search
CPC ..... G06F 3/0638; G06F 3/0608; G06F 3/0673
See application file for complete search history.

(56) References Cited

U.S. PATENT DOCUMENTS

| | | | |
|---|---|---|---|
| 2014/0108703 A1* | 4/2014 | Cohen | G06F 3/0655 711/E12.008 |
| 2016/0162001 A1 | 6/2016 | Jung et al. | |

(Continued)

FOREIGN PATENT DOCUMENTS

| | | |
|---|---|---|
| CN | 106529670 A | 3/2017 |
| CN | 106873916 A | 6/2017 |

(Continued)

OTHER PUBLICATIONS

WIPO, International Search Report dated Feb. 7, 2021.

*Primary Examiner* — Zhuo H Li
(74) *Attorney, Agent, or Firm* — Li & Cai Intellectual Property (USA) Office (57) ABSTRACT

The present application provides a method and a device for controlling a storage format of an on-chip storage resource, the method for controlling the storage format of the on-chip storage resource includes: while mapping a neural network model to a many-core system, generating an on-chip storage resource of each processing core in the many-core system, and storing the on-chip storage resource into a specified file; and parsing out a storage format of the on-chip storage resource based on the specified file, obtaining occupied storage space of each processing core, and adjusting the storage format of the on-chip storage resource of each processing core based on the occupied storage space of each processing core.

9 Claims, 5 Drawing Sheets

(56) References Cited

U.S. PATENT DOCUMENTS

| | | | |
|---|---|---|---|
| 2018/0143853 A1 | 5/2018 | Saeidi et al. | |
| 2019/0187963 A1* | 6/2019 | Bokhari | G06F 9/4881 |
| 2020/0218917 A1* | 7/2020 | Balasubramaniyan | G06N 3/04 |

FOREIGN PATENT DOCUMENTS

| | | |
|---|---|---|
| CN | 109408257 A | 3/2019 |
| CN | 109542830 A | 3/2019 |

* cited by examiner

METHOD AND DEVICE FOR CONTROLLING STORAGE FORMAT OF ON-CHIP STORAGE RESOURCE

CROSS-REFERENCE TO RELATED APPLICATION

The present application is a National Phase Application filed under 35 U.S.C. 371 as a national stage of PCT/CN2020/130618, filed on Nov. 20, 2020, an application claiming priority to Chinese patent application No. 201911163456.9 filed on Nov. 25, 2019 in the Chinese Patent Office, contents of which are incorporated by reference herein in its entirety.

TECHNICAL FIELD

The present application relates to the field of storage technologies for many-core system, and in particular, to a method and an apparatus for controlling a storage format of an on-chip storage resource.

BACKGROUND

When a neural network model, such as a computer Visual Geometry Group (VGG), a Residual Network (ResNet) or the like, is mapped in a many-core system using a reduced instruction set computer-V (RISCV) as a core controller, each core in the many-core system operates under an action of a global phase in a strong synchronization manner.

Therefore, it is an important part for efficient running of the neural network model in the many-core system after being deployed that storage of RISCV codes of each processing core in the many-core system is managed such that each processing core reaches a maximum running performance without occurrence of a situation such as over-limit of a RISCV storage space, overflow of a stack or the like.

SUMMARY

The present application provides a method and a device for controlling a storage format of an on-chip storage resource.

Provided is a method for controlling a storage format of an on-chip storage resource, the method is applied to a many-core system, and includes: while mapping a neural network model to a many-core system, generating an on-chip storage resource of each processing core in the many-core system, and storing the on-chip storage resource into a specified file; and parsing out a storage format of the on-chip storage resource based on the specified file, obtaining occupied storage space of each processing core, and adjusting the storage format of the on-chip storage resource of each processing core based on the occupied storage space of each processing core.

Provided is a device for controlling a storage format of an on-chip storage resource, the device includes: an upper layer mapping module configured to when mapping a neural network model to a many-core system, generate an on-chip storage resource of each processing core in the many-core system and store the on-chip storage resource into a specified file; and a lower layer mapping module configured to parse out a storage format of the on-chip storage resource based on the specified file, obtain occupied storage space of each processing core, and adjust the storage format of the on-chip storage resource of each processing core based on the occupied storage space of each processing core.

Provided is a computer readable storage medium with a computer program stored thereon, wherein the computer program is executed by a processor to implement the method for controlling a storage format of an on-chip storage resource according to the present application.

Provided is a computer program product, when the computer program product is running on a computer, the computer program product causes the computer to perform the method for controlling a storage format of an on-chip storage resource according to the present application.

DETAIL DESCRIPTION OF EMBODIMENTS

Exemplary embodiments of the present application will be described hereinafter with reference to accompanying drawings. While the exemplary embodiments of the present application are shown in the accompanying drawings, the present application may be embodied in many forms and should not be construed as limited to the embodiments set forth herein.

Figure 1:
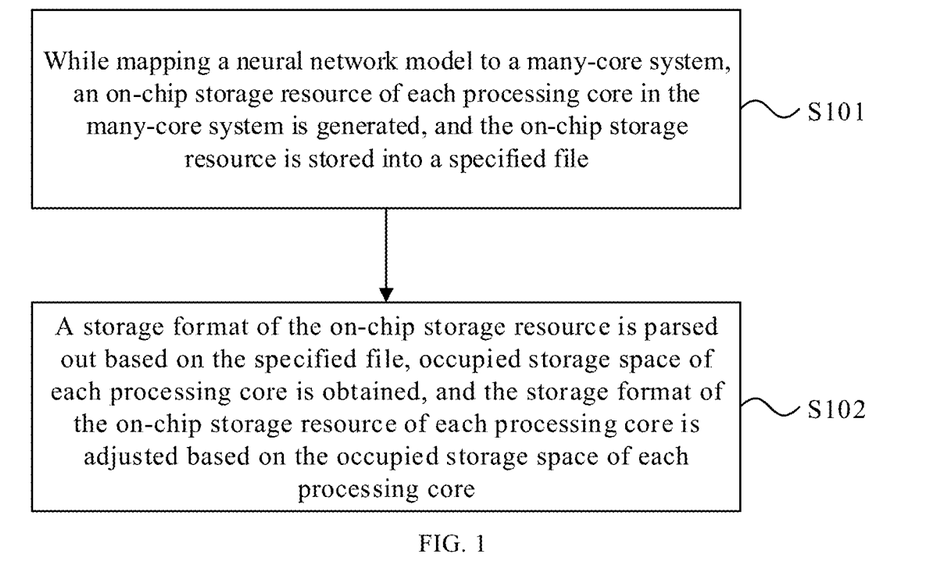
FIG. 1 is a schematic flowchart illuminating a method for controlling a storage format of an on-chip storage resource according to the present application.

FIG. 1 is a schematic flowchart illuminating a method for controlling a storage format of an on-chip storage resource according to the present application. Referring to FIG. 1, the method for controlling the storage format of the on-chip storage resource according to the present application may include the following operations.

In operation S101, while mapping a neural network model to a many-core system, an on-chip storage resource of each processing core in the many-core system is generated, and the on-chip storage resource is stored into a specified file.

In operation S102, a storage format of the on-chip storage resource is parsed out based on the specified file, occupied storage space of each processing core is obtained, and the storage format of the on-chip storage resource of each processing core is adjusted based on the occupied storage space of each processing core.

The many-core system is a multi-core processor including multiple processing cores and used for floating point operations and intensive operations. When data processing is performed by the neural network model, multiple network layers are typically mapped to the many-core system, and the many-core system performs corresponding operations. In operation S101, while mapping the neural network model to the many-core system, the on-chip storage resource of each processing core in the many-core system is generated and stored. In the present application, processes of generating and storing the on-chip storage resource of each processing core in the many-core system may be implemented based on an upper layer mapping tool. The upper layer mapping tool is a tool for parsing model files, such as tensoflow, caffe or the like, and mapping the model files into the many-core system. Configuration of each core in the many-core system may be described with a json file, which is the specified file mentioned in the present application, where the json file may include a list of a phase controlling manner, phase core reception information, and rc (routing) configuration parameters.

In addition, a process of operation S102 may be performed based on a lower layer mapping tool. The lower layer mapping tool may be used to parse the specified file, for example, may parse the specified file to generate multiple types of on-chip storage resources such as the phase controlling manner, the phase core reception information, and the rc configuration parameters, and store the multiple types of the on-chip storage resources in a two-dimensional array, respectively, and inject the two-dimensional array into a RISCV template. In practice, after mapping the neural network model to a many-core architecture based on a RISCV controller, a RISCV control code for each processing core is generated, for example, on-chip storage space of each RISCV core is 32 KB, and available space after removing a code segment and a stack segment is 27 KB. In a related art, the list of controlling manner cannot be dynamically selected according to a usage of storage of a current processing core, thus a maximum performance of the RISCV code cannot be exerted, and a situation such as over-limit of RISCV storage space, overflow of the stack or the like is easy to occur. Based on the solution provided by the present application, the occupied storage space of each processing core in the many-core system can be obtained through the lower layer mapping tool, and a storage state of each processing core can be known in time, so that the storage format of the storage resource can be adjusted to fully utilize the on-chip storage resource, and an operation efficiency after being mapped to each processing core is maximized while the occupied storage space does not exceed 27 KB.

Optionally, the on-chip storage resource includes at least one of a core phase controlling list indicating whether each phase operates or not, a core reception information list for each phase, or routing information for each phase. That is, in addition to the code fragment and the stack fragment, there also are three aspects of storage information occupying the on-chip storage resource, which include a list (phase list) indicating whether each phase operates or not (the core phase controlling list), reception information (N_received list) for each phase (the core reception information list), and rc parameters of transmitting information for each phase (the routing information). For convenience of understanding, the present application is described by taking the on-chip storage resource including the above three aspects of the storage information as an example, the on-chip storage resource may further include other information, and may also include one or more of the above three aspects of the storage information, which is not limited in the present application.

In addition, the present application also defines three storage formats including a first storage format, a second storage format, and a third storage format. The storage format for the core phase controlling list and the core reception information list may include the above three storage formats, and the storage format for the routing information may include the first storage format and the second storage format. In some optional embodiments, all of available storage formats for the above three on-chip storage resources are the second storage format.

The following describes the three storage formats based on the core phase controlling list, respectively.

Firstly, the first storage format is used for storing data in the two-dimensional array. The two-dimensional array is essentially an array with an array as an array element, that is, "an array of arrays". The two-dimensional array may also be referred to as a matrix.

After the models such as the Tensorflow and the caffe are processed by the upper layer mapping tool, the phase controlling manner for each core is generated and stored in the json file, and the lower layer mapping tool parses out the phase controlling manner and stores the phase controlling manner in the two-dimensional array.

Illustratively, config_tc_phase_list[PHASE_LIST_LEN][3]={{3, 5, 2}, {1,2,1}, . . . }, PHASE_DELAY=4.

Taking the above two-dimensional array as an example, an operation condition of the core phase is as follows:

(1) the number PHASE_DELAY of phases are in an idle state;
(2) 3 phases are in the idle state and 5 phases are in an active state;
(3) circulating (2) twice;
(4) 1 phase is in the idle state and 2 phases are in the active state;
(5) circulating (4) once; and
(6) circulating by taking the above two-dimensional array phase_list as a period.

Figure 2:
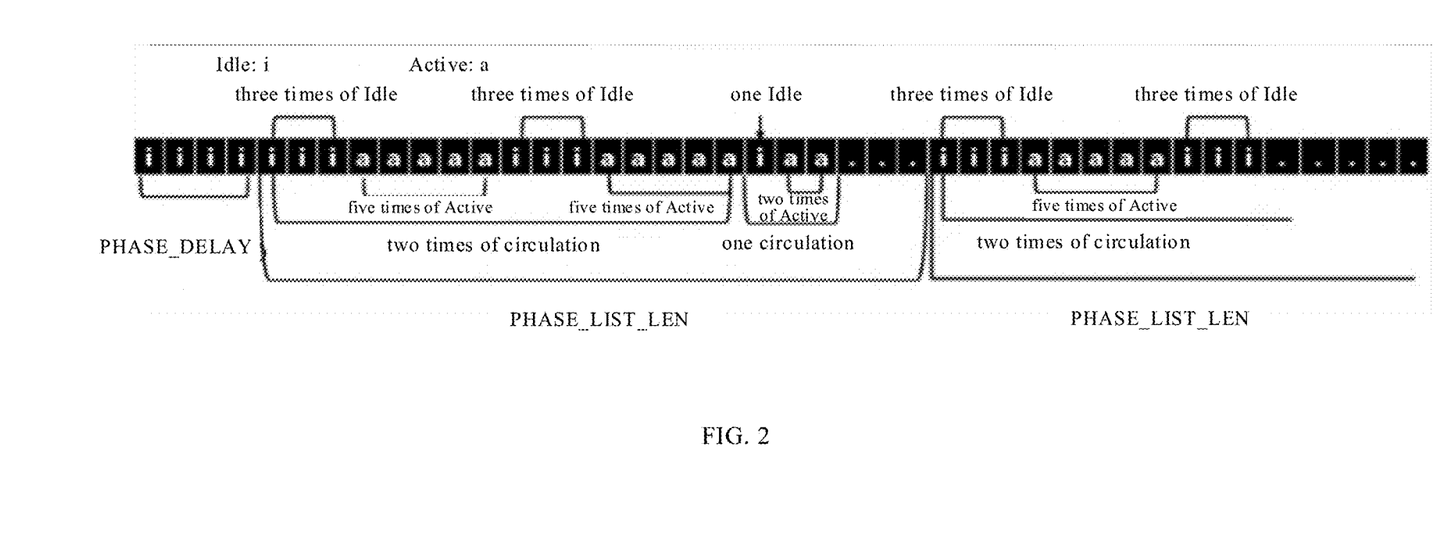
FIG. 2 is a schematic view illuminating a phase control manner according to the present application.

In one embodiment, the phase controlling manner is shown in FIG. 2.

In the first storage format, a function for parsing the two-dimensional array needs to be added to the RISCV code to obtain a flag indicating whether a phase operates or not. Such manner needs longer time during running, which may result in lower running efficiency after mapping.

Secondly, the second storage format is used for storing data of one phase with one character (char) type data, hereinafter, the char type is taken as an example. The char type data is a basic data type that can only accommodate a single character.

For example, the two-dimensional array may be expanded in advance through the lower layer mapping tool, each char type data is used for storing the flag indicating whether the phase operates or not, for example, 0 represents non-operating, 1 represents operating, and the char type array is directly typed into a C language source program file (i.e., .c file). Such manner occupies larger space of a memory, but it takes less time to run the parsing and only needs to take a value based on an array index. This efficient manner can be selected.

Thirdly, the third storage format is used for storing each bit of the char type data into the data of one phase.

Taking the core phase controlling as an example, each bit is stored as the flag indicating whether the phase operates or not, for example, 0 represents non-operating, and 1 represents operating.

In practice, the storage format of the core phase controlling list includes the first storage format, the second storage format and the third storage format. The storage format of the core reception information list (N_received list) includes the first storage format, the second storage format, and the third storage format. The storage format of the routing information includes the first storage format and the second storage format. Each bit of the char type data is stored as the flag indicating whether the phase operates or not, for example, 0 represents non-operating, and 1 represents operating.

In practice, the core reception information list (N_received list) may also adopt the above storage manners, and may adopt the second storage format.

The routing information (i.e., the rc parameters) can be dynamically changed according to changing of the phase. The routing information has periodicity, and a destination address increment of each phase is fixed. The routing information can be expanded and stored into the second storage format, and can also be folded into a format similar to the first storage format. The second storage format occupies the larger space of the memory, but takes shorter time for operating; the first storage format occupies smaller space, but takes longer time for operating, thus the second storage format can be used.

Figure 3:
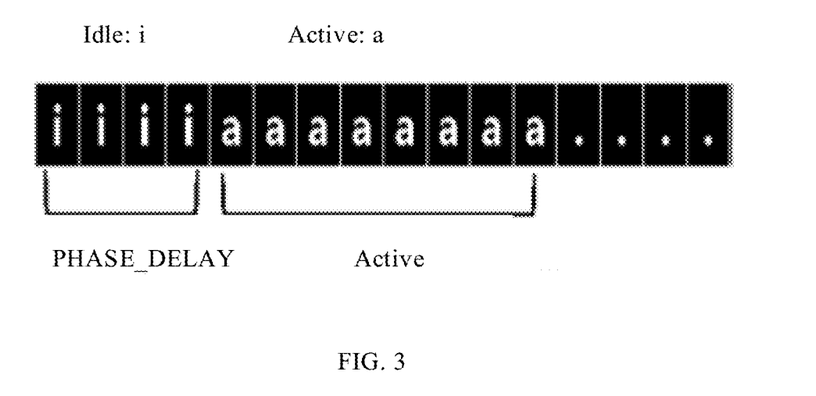
FIG. 3 is another schematic view illuminating a phase control manner according to the present application.

In another optional embodiment of the present application, a case where the two-dimensional array in the phase list is config_tc_phase_list[1][3]={{0, 1, 1}}, and PHASE_DELAY=N is a case where all of remaining phases are operating after delaying N phases which do not operate, as shown in FIG. 3 (PHASE_DELAY=4). During calling of a RISCV code function, only one determination is needed to obtain the flag indicating whether the current phase operates or not, less space is occupied and higher operation efficiency is achieved compared with the first storage format, the second storage format and the third storage format. This manner may be added as a special case to a RISCV code template, and may be turned on and off in a macro-defined manner. When such a two-dimensional list exists after the neural network model is mapped to the processing core, a macro switch in the template is turned on.

Optionally, adjusting, in operation S102, the storage format of the on-chip storage resource of each processing core based on the occupied storage space of each processing core may include: comparing, for each processing core, the occupied storage space of the processing core with preset storage space; and switching the storage format of the on-chip storage resource on the processing core with a preset rule according to the comparison result.

In the present application, switching the storage format of the on-chip storage resource on the processing core with the preset rule according to the comparison result may include: determining whether the occupied storage space of the processing core is larger than the preset storage space; in a case where the occupied storage space of the processing core is larger than the preset storage space, selecting any one on-chip storage resource and switching the storage format of the selected on-chip storage resource.

In the present application, after selecting the on-chip storage resource and switching the storage format of the selected on-chip storage resource, the method may further include: continuously obtaining first occupied storage space of the processing core, and determining whether the first occupied storage space is larger than the preset storage space; and in a case where the first occupied storage space is larger than the preset storage space, selecting any one on-chip storage resource from on-chip storage resources the storage format of which are not switched, and switching the storage format of the selected on-chip storage resource.

In the present application, switching the storage format of the on-chip storage resource on the processing core with the preset rule according to the comparison result may include the follows.

1. Determining whether the occupied storage space of the processing core is larger than the preset storage space, and in the case where the occupied storage space of the processing core is larger than the preset storage space, selecting any one on-chip storage resource to switch the storage format of the on-chip storage resource.

2. Continuously obtaining the first occupied storage space of the processing core, and determining whether the first occupied storage space is larger than the preset storage space, and in the case where the first occupied storage space is larger than the preset storage space, selecting any one on-chip storage resource from the on-chip storage resources the storage format of which are not switched, and switching the storage format of the selected on-chip storage resource.

Based on the method provided by the present application, it can not only ensure that the on-chip storage space of the processing core in the many-core system does not exceed the preset storage space (for example, 27 KB), but also optimize the operation efficiency of the many-core system. When the storage format of the storage resource is adjusted in the present application, a sequence of the multiple types of the storage resources is not limited. For convenience of understanding, the following description is made by taking a sequence of the core phase controlling list, the core reception information list, and the routing information as an example.

Figure 4:
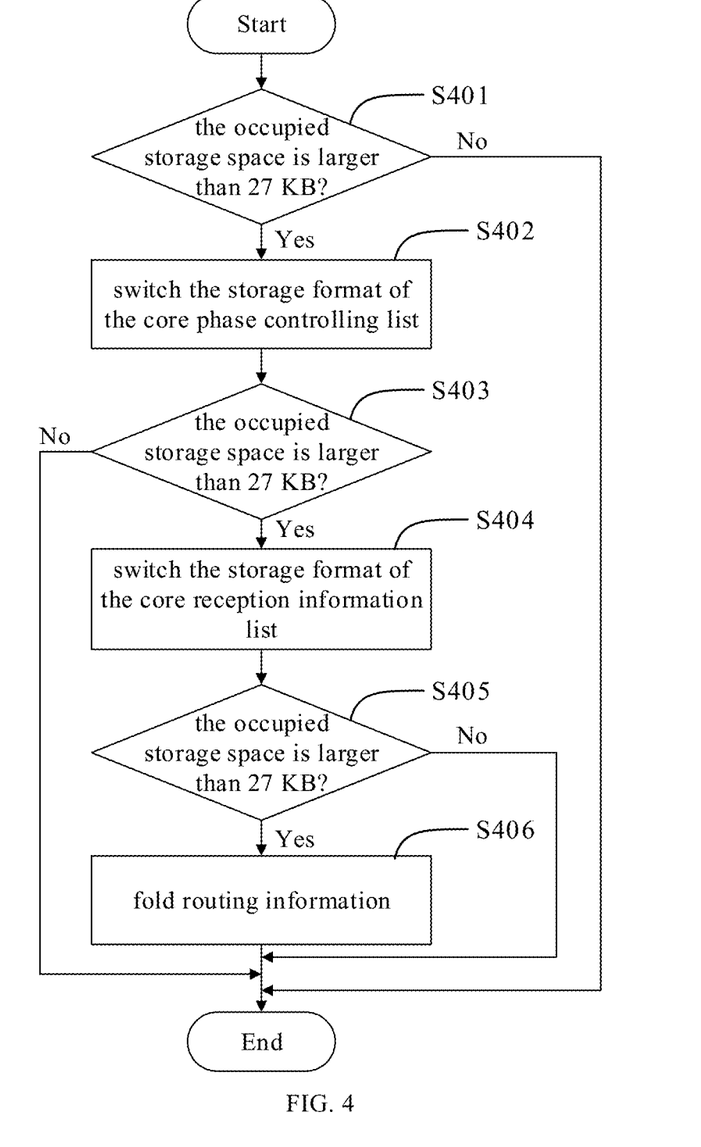
FIG. 4 is another schematic flowchart illuminating a method for controlling a storage format of an on-chip storage resource according to the present application.

FIG. 4 is another schematic flowchart illuminating a method for controlling a storage format of an on-chip storage resource according to the present application, and the method provided may include the following operations.

In operation S401, the two-dimensional array of the core phase control list and the two-dimensional array of the core reception information list are expanded respectively (the preforming process of which can be carried out by adopting the above-mentioned lower layer mapping tool) to obtain total_phase_len and total_rx_phase_len, respectively, obtain space (rc_space_occupy) occupied by each part of the routing information, and determine whether the occupied storage space is larger than 27 KB, if it is, the method goes to operation S402, and if it is not, the determination is finished.

Figure 5:
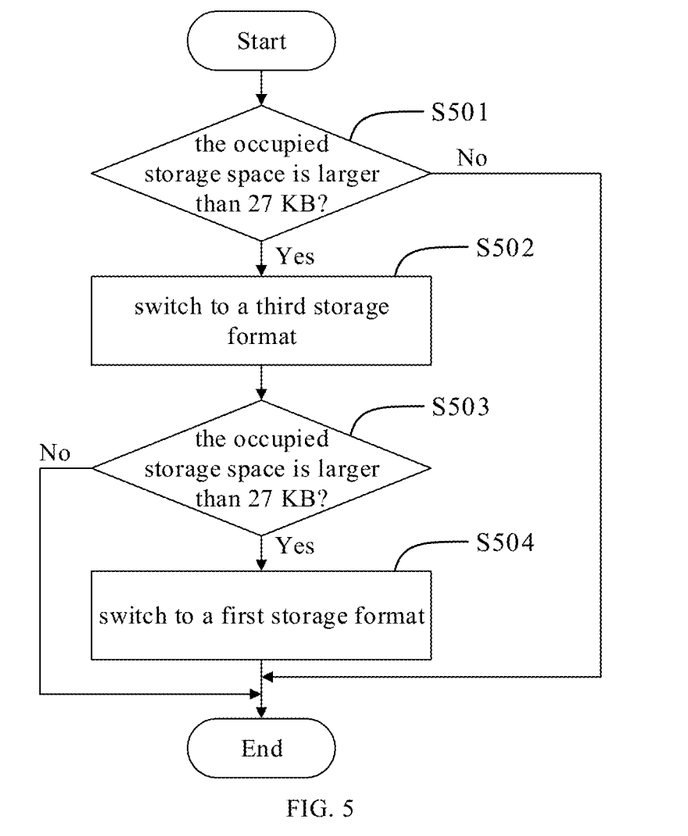
FIG. 5 is still another schematic flowchart illustrating a method for controlling a storage format of an on-chip storage resource according to the present application.

In operation S402, the storage format of the core phase control list is switched, and the switching process may refer to FIG. 5.

In operation S403, whether the currently occupied storage space is more than 27 KB is continuously determined; if it is, the method goes to operation S404, and if it is not, the determination is finished.

In operation S404, the storage format of the core reception information list is switched, and the switching process may also refer to FIG. 5.

In operation S405, whether the currently occupied storage space is more than 27 KB is continuously determined, if it is, the method goes to operation S406, and if it is not, the determination is finished.

In operation S406, the routing information is folded, that is, the storage format of the routing information is converted into the first storage format. In the present application, a default storage format of the core phase control list, the core reception information list and the routing information is the second storage format.

FIG. 5 is still another schematic flowchart illustrating a method for controlling a storage format of an on-chip storage resource according to the present application, and the method provided may include the following operations.

In operation S501, whether the current occupied storage space is larger than 27 KB is determined, if it is, the method goes to operation S502, and if it is not, the determination is finished.

In operation S502, switching to the third storage format.

In operation S503, whether the currently occupied storage space is more than 27 KB is continuously determined, if it is, the method goes to operation S504, and if it is not, the determination is finished.

In operation S504, switching to the first storage format.

In the present application, the scheme provided may be applied to the core phase control list and the core reception information list. Because the core phase control list and the core reception information list default to the second storage format, when determining the currently occupied storage space is greater than 27 KB for the first time, it may be considered to fold the core phase control list, convert the core phase control list into the third storage format for storage. After calculate total space occupied, and if the total space occupied is still greater than 27 KB, the first storage format is select for storing the core phase control list.

Generally, when it is determined that the storage space occupied is greater than 27 KB for the first time, the storage format of the core phase control list may be sequentially converted, that is, from the second storage format to the third storage format, and then to the first storage format. After the storage format of the core phase control list is sequentially converted, if the calculated storage space occupied is still larger than 27 KB, the storage format of the core reception information list may be switched according to the method as shown in FIG. 5, and if the storage space is still larger than 27 KB after switching, the routing information may be folded.

Combining the embodiments shown in FIGS. 4 and 5, each core has 32 KB of storage space, and after removing the code segment and the stack segment, actual available space is 27 KB, and when a data segment is larger than 27 KB, the stack segment space will be illegally occupied, which results in overflow of the stack. In the lower layer mapping tool, a principle of prioritizing the operation efficiency after mapping is adopts, and in the present application, the phase list (the phase controlling list) of the two-dimensional array phase list extracted from the j son file is expanded according to the manner of the second storage format, and when the occupied storage space is larger than 27 KB, the switching of the three formats of the phase list, the switching of three formats of the N_received list and the folding of the rc routing parameters are performed in sequence until the occupied storage space is smaller than 27 KB, so that the maximum operation efficiency of the RISCV code is optimized while the on-chip storage space of each processing core of the many-core system is optimized.

In the three types of information described above, when it is determined that the occupied storage space is greater than 27 KB, the adjusting between each format available for one type of information of the on-chip storage resource is performed, for example, the switching between the formats is performed on the core phase controlling list, and when it is determined that the occupied storage space is still greater than 27 KB, the adjusting between the storage formats is performed on another type of information (for example, the core reception information list) of the storage resource, so that the switching between the storage formats of the same resource is performed first, and then switching between the storage formats of another type of resource information is performed.

In another embodiment of the present application, when it is determined for the first time that the occupied storage space is greater than 27 KB, the storage format of one piece of resource information may be adjusted, for example, the storage format of the core phase controlling list is first switched from the second storage format to the third storage format, and when it is determined for the second time that the occupied storage space is greater than 27 KB, another on-chip storage resource such as the core reception information list may be selected, and the storage format of the core reception information list is switched from the second storage format to the third storage format. That is, the storage format of each piece of resource information in the on-chip storage resources may be adjusted once each time it is determined that the occupied storage space is larger than 27 KB, and after the storage format of each piece of resource information of the on-chip storage resources is adjusted once, the storage format of each on-chip storage resource is adjusted again. Other adjustment manners may be performed in practice, and the present application is not limited.

According to the scheme provided by the present application, under a strong synchronization manner of the many-core system, a method for selecting the core phase controlling list, the core reception information list and the rc routing parameters in the lower layer mapping tool according to the usage condition of the storage space of each RISCV core can adapt to and adjust an optimal storage manner of each processing core according to a storage occupation condition of each processing core. In a case where over-limit of the core storage space and overflow of the stack for each processing core are guaranteed not to occur, the operation efficiency of the RISCV code of each processing core is maximized, and therefore the operational efficiency after mapping of the whole mapping scheme is improved.

Figure 6:
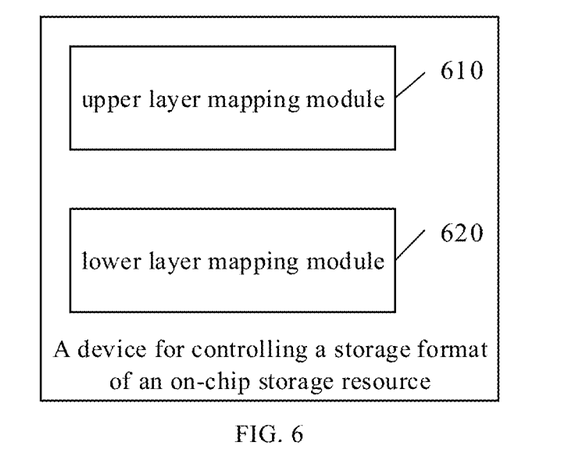
FIG. 6 is a schematic structural view illuminating a device for controlling a storage format of an on-chip storage resource according to the present application.

The present application further provides an device for controlling a storage format of an on-chip storage resource, and as shown in FIG. 6, the device includes the following modules.

An upper layer mapping module 610 is configured to generate an on-chip storage resource of each processing core in a many-core system and store the on-chip storage resource into a specified file while mapping a neural network model to the many-core system.

A lower layer mapping module 620 is configured to parse out a storage format of the on-chip storage resource based on the specified file, obtain occupied storage space of each processing core, and adjust the storage format of the on-chip storage resource of each processing core based on the occupied storage space of each processing core.

Optionally, the on-chip storage resource includes at least one of a core phase controlling list indicating whether each phase operates or not, a core reception information list for each phase, or routing information for each phase.

The storage format of the on-chip storage resource includes the follows.

A first storage format is used for storing data in the two-dimensional array.

A second storage format is used for storing data of one phase with one char type data.

A third storage format is used for storing each bit of the char type data into the data of the one phase.

The storage format of the core phase controlling list includes the first storage format, the second storage format and the third storage format.

The storage format of the core reception information list includes the first storage format, the second storage format and the third storage forma.

The storage format of the routing information includes the first storage format and the second storage format.

In the present application, the lower layer mapping module 620 may be further configured to compare, for each processing core, the occupied storage space of the processing core with preset storage space, and switch the storage format of the on-chip storage resource on the processing core with a preset rule according to the comparison result.

In an optional embodiment of the present application, the lower layer mapping module 620 may be further configured to determine whether the occupied storage space of the processing core is greater than the preset storage space, and in a case where the occupied storage space of the processing core is larger than the preset storage space, select any one on-chip storage resource and switch the storage format of the selected on-chip storage resource.

In an optional embodiment of the present application, the lower layer mapping module 620 may be further configured to continuously obtain first occupied storage space of the processing core after selecting the on-chip storage resource and switching the storage format of the selected on-chip storage resource, and determine whether the first occupied storage space is greater than the preset storage space, and in a case where the first occupied storage space is larger than the preset storage space, select any one on-chip storage resource from on-chip storage resources the storage format of which are not switched and switch the storage format of the selected on-chip storage resource.

The present application further provides a computer readable storage medium, in which a computer program is stored, where the computer program is executed by a processor to implement the method for controlling the storage format of the on-chip storage resource according to any one of the above embodiments.

The present application further provide a computer program product, when the computer program product is running on a computer, the computer program product causes the computer to execute the method for controlling the storage format of the on-chip storage resource according to any one of the embodiments.

The embodiments of the application provide a more efficient method and a more efficient device for controlling the storage format of the on-chip storage resource. Based on the scheme provided by the present application, the occupied storage space of each processing core in the many-core system can be obtained, the storage state of each processing core can be known in time, and therefore the storage format of the on-chip storage resource can be adjusted, the on-chip storage resource can be fully utilized, the operation efficiency after mapping to each processing core is maximized, and the occupied storage space does not exceed the preset storage space, thus the operation efficiency of the RISCV control code of each processing core is maximized in a case where over-limit of the core storage space and overflow of the stack will not occur in each processing core, so that the operation efficiency after mapping of the whole mapping scheme is improved.

In the description provided herein, numerous details are set forth. However, the embodiments of the present application may be practiced without these details. In some instances, well-known methods, structures and techniques have not been shown in detail in order not to obscure an understanding for the description.

In the above description of example embodiments of the present application, various features of the present application are sometimes grouped together in a single embodiment, figure, or description thereof for a purpose of streamlining the present application and aiding in the understanding of one or more of the various claimed aspects. However, the disclosed method should not be construed to reflect the intent that the claimed application is intended to cover features more than features clearly defined in each claim. As the following claims reflect, claimed aspects lie in less than all features of a single foregoing disclosed embodiment. Thus, the claims following the detailed description are hereby expressly incorporated into the detailed description, with each claim standing on its own as a separate embodiment of the present application.

Although some embodiments described herein include some features included in other embodiments, but not other features, combinations of features of different embodiments are meant to be within the scope of the present application and form different embodiments. For example, in the claims, any of the claimed embodiments may be used in any combination.

What is claimed is:

1. A method for controlling a storage format of an on-chip storage resource comprises:
    while mapping a neural network model to a many-core system, generating an on-chip storage resource of each processing core in the many-core system, and storing the on-chip storage resource into a specified file; and
    parsing out a storage format of the on-chip storage resource based on the specified file, obtaining occupied storage space of each processing core, and adjusting the storage format of the on-chip storage resource of each processing core based on the occupied storage space of each processing core.

2. The method of claim 1, wherein the on-chip storage resource comprises at least one of a core phase controlling list indicating whether each phase operates or not, a core reception information list for each phase, or routing information for each phase.

3. The method of claim 2, wherein the storage format of the on-chip storage resource comprises:
    a first storage format for storing data in a two-dimensional array;
    a second storage format for storing data of one phase with one character (char) type data; and
    a third storage format for storing each bit of the char type data into the data of the one phase.

4. The method of claim 3, wherein the storage format of the core phase controlling list comprises the first storage format, the second storage format, and the third storage format;
    the storage format of the core reception information list comprises the first storage format, the second storage format and the third storage format; and
    the storage format of the routing information comprises the first storage format and the second storage format.

5. The method of claim 1, wherein adjusting the storage format of the on-chip storage resource of each processing core based on the occupied storage space of each processing core comprises:
    for each processing core, comparing the occupied storage space of the processing core with preset storage space; and
    switching the storage format of the on-chip storage resource of the processing core with a preset rule according to a result of the comparing.

6. The method of claim 5, wherein switching the storage format of the on-chip storage resource of the processing core with the preset rule according to the result of the comparing comprises:
    determining whether the occupied storage space of the processing core is larger than the preset storage space; and
    in a case where the occupied storage space of the processing core is larger than the preset storage space, selecting any one on-chip storage resource and switching the storage format of the selected on-chip storage resource.

7. The method of claim 6, wherein after selecting the on-chip storage resource and switching the storage format of the selected on-chip storage resource, the method further comprises:
   continuously obtaining first occupied storage space of the processing core, and determining whether the first occupied storage space is larger than the preset storage space; and
   in a case where the first occupied storage space is larger than the preset storage space, selecting any one on-chip storage resource from on-chip storage resources the storage format of which are not switched, and switching the storage format of the selected on-chip storage resource.

8. A non-transient computer readable storage medium in which a computer program is stored, wherein the computer program is executed by a processor to implement the method of controlling the storage format of the on-chip storage resource of claim 1.

9. A device for controlling a storage format of an on-chip storage resource, comprises:
   an upper layer mapping module configured to generate an on-chip storage resource of each processing core in a many-core system and store the on-chip storage resource into a specified file while mapping a neural network model to the many-core system; and
   a lower layer mapping module configured to parse out a storage format of the on-chip storage resource based on the specified file, obtain occupied storage space of each processing core, and adjust the storage format of the on-chip storage resource of each processing core based on the occupied storage space of each processing core.

* * * * *